United States Patent
Shah et al.

(10) Patent No.: US 11,622,260 B2
(45) Date of Patent: Apr. 4, 2023

(54) ENTERPRISE EMBEDDED SUBSCRIBER IDENTIFICATION MODULE SOLUTIONS

(71) Applicant: T-Mobile USA, Inc., Bellevue, WA (US)

(72) Inventors: Mehul Shah, Bellevue, WA (US); Babak Namiranian, Bothell, WA (US)

(73) Assignee: T-Mobile USA, Inc., Bellevue, WA (US)

(*) Notice: Subject to any disclaimer, the term of this patent is extended or adjusted under 35 U.S.C. 154(b) by 29 days.

(21) Appl. No.: 17/460,997

(22) Filed: Aug. 30, 2021

(65) Prior Publication Data

US 2022/0053317 A1     Feb. 17, 2022

Related U.S. Application Data (63) Continuation of application No. 16/887,502, filed on May 29, 2020, now Pat. No. 11,109,220.

(51) Int. Cl.
| | |
|---|---|
| *H04W 8/18* | (2009.01) |
| *H04W 8/20* | (2009.01) |
| *H04W 4/50* | (2018.01) |
| *H04W 60/06* | (2009.01) |
| *H04W 12/30* | (2021.01) |

(52) U.S. Cl.
CPC ............ *H04W 8/183* (2013.01); *H04W 4/50* (2018.02); *H04W 8/205* (2013.01); *H04W 12/35* (2021.01); *H04W 60/06* (2013.01)

(58) Field of Classification Search
CPC ......... H04W 4/50; H04W 12/06; H04W 4/60; H04W 8/18; H04W 8/265; H04W 12/72; H04W 8/06; H04W 8/183; H04W 12/35; H04W 8/205; H04M 15/7556
See application file for complete search history.

(56) References Cited

U.S. PATENT DOCUMENTS

| | | |
|---|---|---|
| 10,455,536 B1 | 10/2019 | Khawand et al. |
| 10,652,728 B1 | 5/2020 | Guday et al. |
| 10,826,945 B1 | 11/2020 | Xu et al. |
| 10,848,961 B1 | 11/2020 | Larsson et al. |
| 10,911,945 B1 | 2/2021 | Youngs |
| 11,109,220 B1 | 8/2021 | Shah et al. |
| 2009/0007091 A1 | 1/2009 | Appiah et al. |
| 2012/0108204 A1 | 5/2012 | Schell et al. |

(Continued)

FOREIGN PATENT DOCUMENTS

WO     2019136044 A1     7/2019

OTHER PUBLICATIONS

European Patent Office, Extended European Search Report, EP Patent Application 21176552.4, dated Oct. 22, 2021, 6 pages.

*Primary Examiner* — Dung Hong
(74) *Attorney, Agent, or Firm* — Perkins Coie LLP (57) ABSTRACT

Methods, apparatus, and systems for providing an embedded subscriber identity module (eSIM) solution are disclosed. In one example, a method for providing an eSIM solution to enterprises includes receiving, by a network server operated by a network operator, a request from an enterprise device management system requesting an eSIM profile for a communication device. The method also includes transmitting, by the network server, information to a discovery server associated with the communication device to register the communication device with the discovery sever.

19 Claims, 10 Drawing Sheets

(56) References Cited

U.S. PATENT DOCUMENTS

| | | | |
|---|---|---|---|
| 2015/0281964 A1 | 10/2015 | Seo et al. | |
| 2016/0020802 A1 | 1/2016 | Lee et al. | |
| 2016/0020803 A1 | 1/2016 | Cha et al. | |
| 2016/0020804 A1 | 1/2016 | Lee et al. | |
| 2016/0352917 A1 | 12/2016 | Pieda et al. | |
| 2017/0033823 A1 | 2/2017 | Smith et al. | |
| 2017/0048713 A1 | 2/2017 | Guday et al. | |
| 2017/0064552 A1 | 3/2017 | Park et al. | |
| 2017/0142121 A1 | 5/2017 | Lee et al. | |
| 2017/0338944 A1 | 11/2017 | Yang et al. | |
| 2017/0338954 A1 | 11/2017 | Yang et al. | |
| 2018/0014339 A1 | 1/2018 | Baek et al. | |
| 2018/0070224 A1 | 3/2018 | Park et al. | |
| 2018/0146364 A1 | 5/2018 | Coureau et al. | |
| 2019/0037335 A1* | 1/2019 | Steck | H04W 8/186 |
| 2019/0069122 A1 | 2/2019 | Karimli et al. | |
| 2019/0075453 A1* | 3/2019 | Yoon | H04W 8/245 |
| 2019/0098488 A1* | 3/2019 | Syed | H04L 67/306 |
| 2019/0140837 A1* | 5/2019 | Cheng | H04W 12/40 |
| 2019/0230087 A1* | 7/2019 | Gharout | H04W 12/35 |
| 2019/0289454 A1 | 9/2019 | Inoue | |
| 2019/0324735 A1* | 10/2019 | Park | H04W 8/205 |
| 2019/0364415 A1* | 11/2019 | Gao | H04W 8/20 |
| 2019/0373448 A1 | 12/2019 | Gao | |
| 2020/0015069 A1 | 1/2020 | Anslot et al. | |
| 2020/0021975 A1 | 1/2020 | Schouler | |
| 2020/0092711 A1 | 3/2020 | Chen et al. | |
| 2020/0137558 A1 | 4/2020 | Chaugule et al. | |
| 2020/0236546 A1 | 7/2020 | Yu et al. | |
| 2020/0288300 A1* | 9/2020 | Oswal | H04W 8/205 |
| 2020/0314638 A1 | 10/2020 | Veneroso | |

\* cited by examiner

ENTERPRISE EMBEDDED SUBSCRIBER IDENTIFICATION MODULE SOLUTIONS

CROSS-REFERENCE TO RELATED APPLICATIONS

This application is a continuation of U.S. patent application Ser. No. 16/887,502, filed on May 29, 2020, entitled ENTERPRISE EMBEDDED SUBSCRIBER IDENTIFICATION MODULE SOLUTIONS, which is hereby incorporated by reference in its entirety.

BACKGROUND

A Subscriber Identification Module (SIM) is widely known as a SIM card. An eSIM refers to an embedded SIM that is embedded directly into a device. An eSIM can be provisioned remotely to add or remove operators, thereby eliminating the need to physically change the SIM card. Technical solutions using eSIM technology are widely applicable to various Internet of things (IoT) scenarios, including both consumer and enterprise uses.

DETAILED DESCRIPTION

Figure 1:
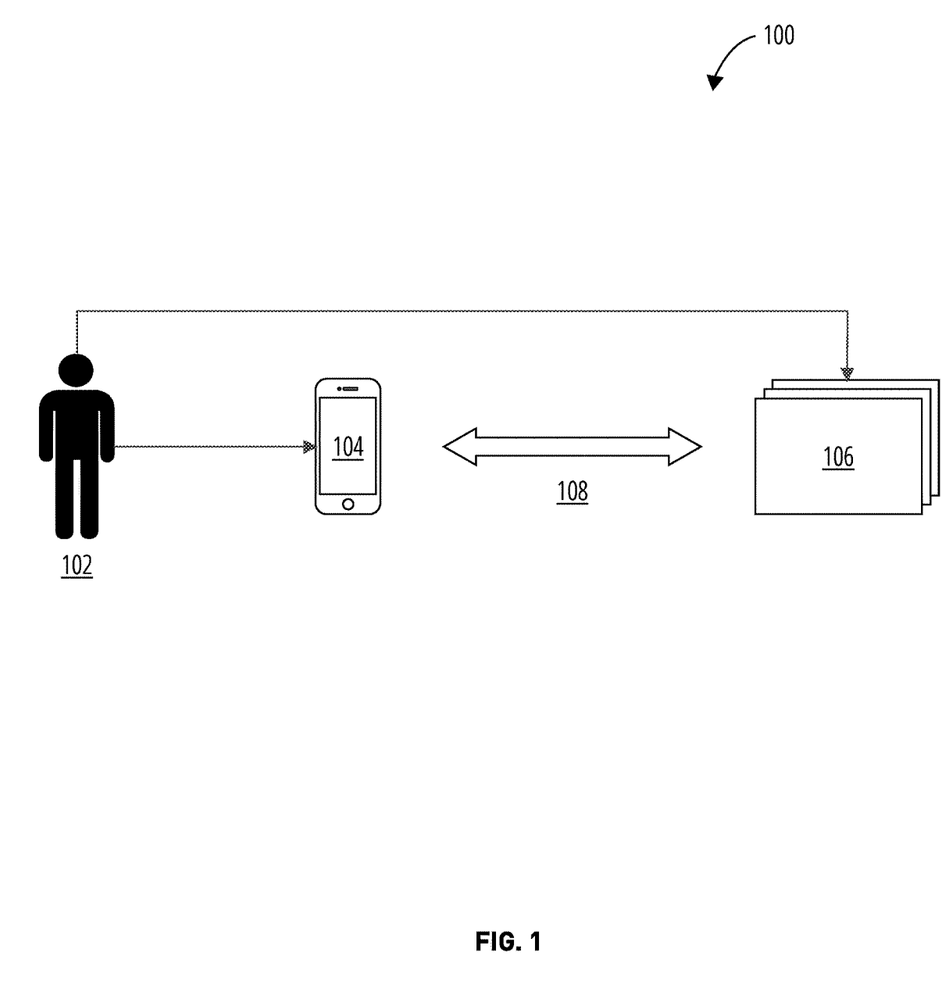
FIG. 1 illustrates an example of obtaining a new subscription by a consumer device with eSIM capabilities.

The use of eSIM offers customers the convenience of obtaining new mobile subscriptions directly from their mobile devices. FIG. 1 illustrates an example of obtaining a new subscription by a consumer device with eSIM capabilities. In FIG. 1, an owner of a mobile device 102 buys a subscription from a mobile network operator (MNO) 106. To allow the consumer device with eSIM capability 104 to be associated with the mobile operator subscription, a discovery service can be used to perform eSIM profile provisioning 108. Currently, the Global System for Mobile Communications, also referred to as GSM Association (GSMA), has provided a global eSIM specification to enable remote SIM provisioning of consumer devices. For example, the GSMA eSIM Root Discovery Service, which is an integral part of the GSMA Remote SIM Provisioning (RSP) Requirements Specification and Technical Specification, acts as a central communication point for profile acquisition. The GSMA eSIM Root Discovery Service is a globally available services for all eSIM-enabled consumer devices.

Figure 2:
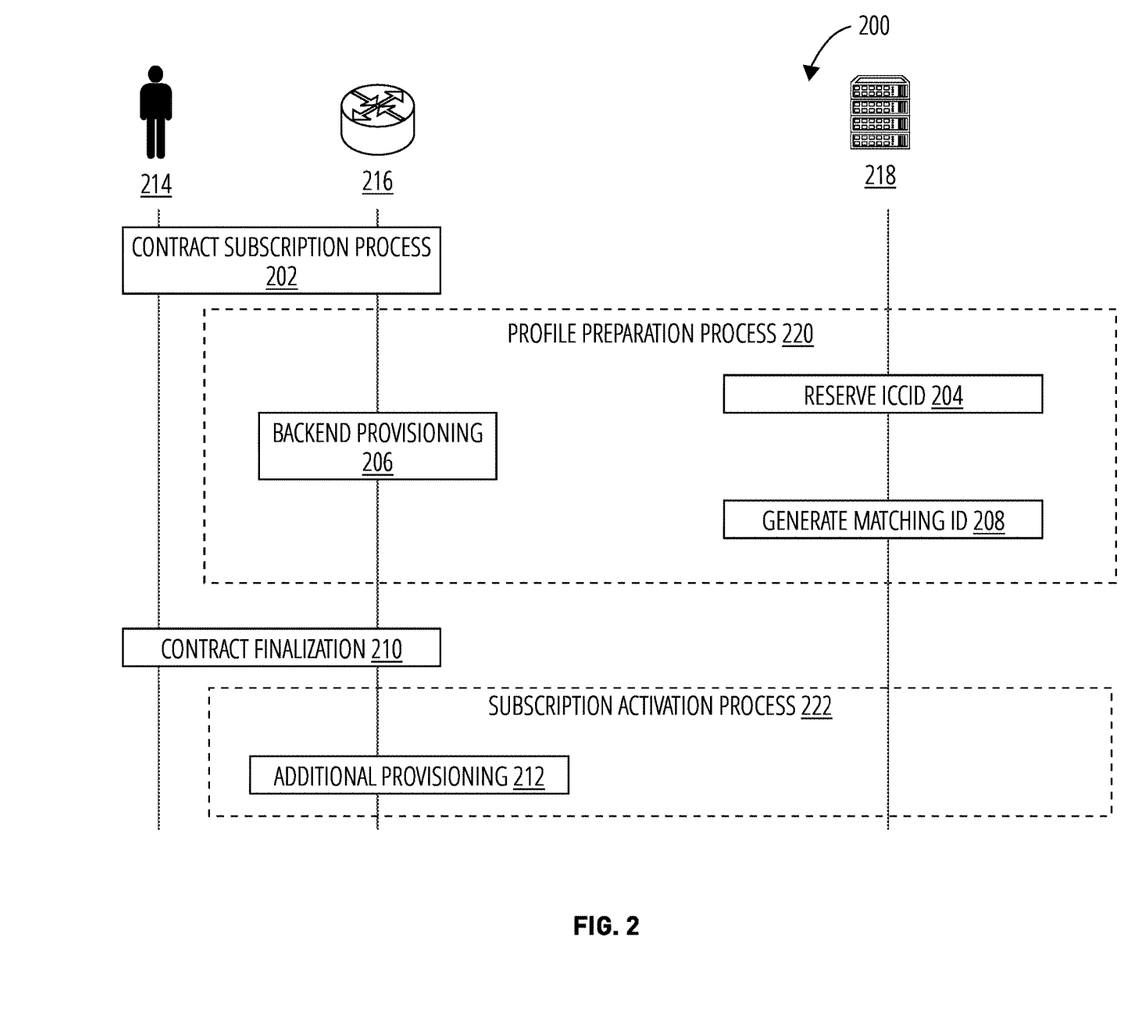
FIG. 2 illustrates an example of a profile acquisition process for a consumer device.

FIG. 2 illustrates an example of a profile acquisition process for a consumer device. An end-user 214 starts a contract subscription process 202 with an MNO server 216. The MNO server 216 contacts the GSMA Root Subscription Manager-Discovery Preparation+ (SM-DP+) server 218 to start the profile preparation process 220 for subsequent profile acquisition. The MNO server 216 performs backend provisioning of the device at operation 206. The SM-DP+ server 218 reserves, at operation 204, the Integrated Circuit Card Identifier (ICCID) and generates, at operation 208, an activation code (also referred to as MatchingID). The generated activation code is then transmitted to the MNO server to complete the profile preparation process 220. In the contract finalization stage 210, the profile associated with the activation code can be downloaded for the consumer device 214 from the SM-DP+ server 218 using the SM-DP+ server address. The MNO server 216 then performs additional subscription activation process 222, and if needed, performs additional provisioning operations 212.

With the wide use of eSIMs in today's consumer devices, such as Apple iPhones, iPads and watches, Google Pixels, and various laptops, it is desirable for enterprises to leverage the increasing availability of eSIM capable devices. Oftentimes, an enterprise establishes a contractual relationship with an MNO to provide eSIM profiles (that is, network connectivity) to its users. In many cases, the enterprise orders eSIM-capable devices in bulk or allows employees to bring their own eSIM-capable devices, so unique identifiers of the devices, such as the Embedded Universal Integrated Circuit Card (eUICC) Identifications (EIDs) associated with the devices, may be unknown to the enterprise. Furthermore, the enterprise prefers to allocate or assign profiles to its users as needed. For example, different departments within the enterprise can allocate different numbers of profiles to different types of devices. The linkage between the device EIDs and the assigned eSIM profiles is not always known to the enterprise at the time of the profile allocation, yet the enterprise wants a seamless process for the devices to acquire eSIM profiles. Unlike consumer GSMA eSIM usage, however, enterprise eSIM usage has not been fully defined by the GSMA. While there are on-going GSMA discussions to address enterprise need for eSIM, adoption of future GSMA enterprise eSIM solutions by device Original Equipment Manufacturers (OEMs) is unclear at this point.

Furthermore, using the GSMA Root Subscription Manager-Discovery Server (SM-DS) for enterprises poses a main challenge: the GSMA Root SM-DS requires knowing the device EIDs prior to device registration, which is not possible in many enterprise use scenarios. A single global GSMA Root SM-DS also has its inherent limitations with respect to scalability and operation costs as enterprise eSIM usage expands across the globe. To support enterprises that handle a multitude of devices, it is desirable for the OEMS to provide respective discovery servers. Correspondingly, the current consumer eSIM solutions, including the use of a single eSIM Root Discovery Service, are insufficient to address enterprise eSIM needs.

This patent document discloses techniques that can be implemented in various embodiments to allow enterprises to flexibly implement eSIM solutions, as well as provide other benefits. The disclosed techniques can be applied to ensure enterprise integration to the MNOs for subscription order fulfillment and provide a methodology to allow an enterprise to select, download, and enable an eSIM profile. Furthermore, the disclosed techniques can be implemented to enable enterprises to allocate, prepare, and provide eSIM profiles to a multitude of devices.

Figure 3:
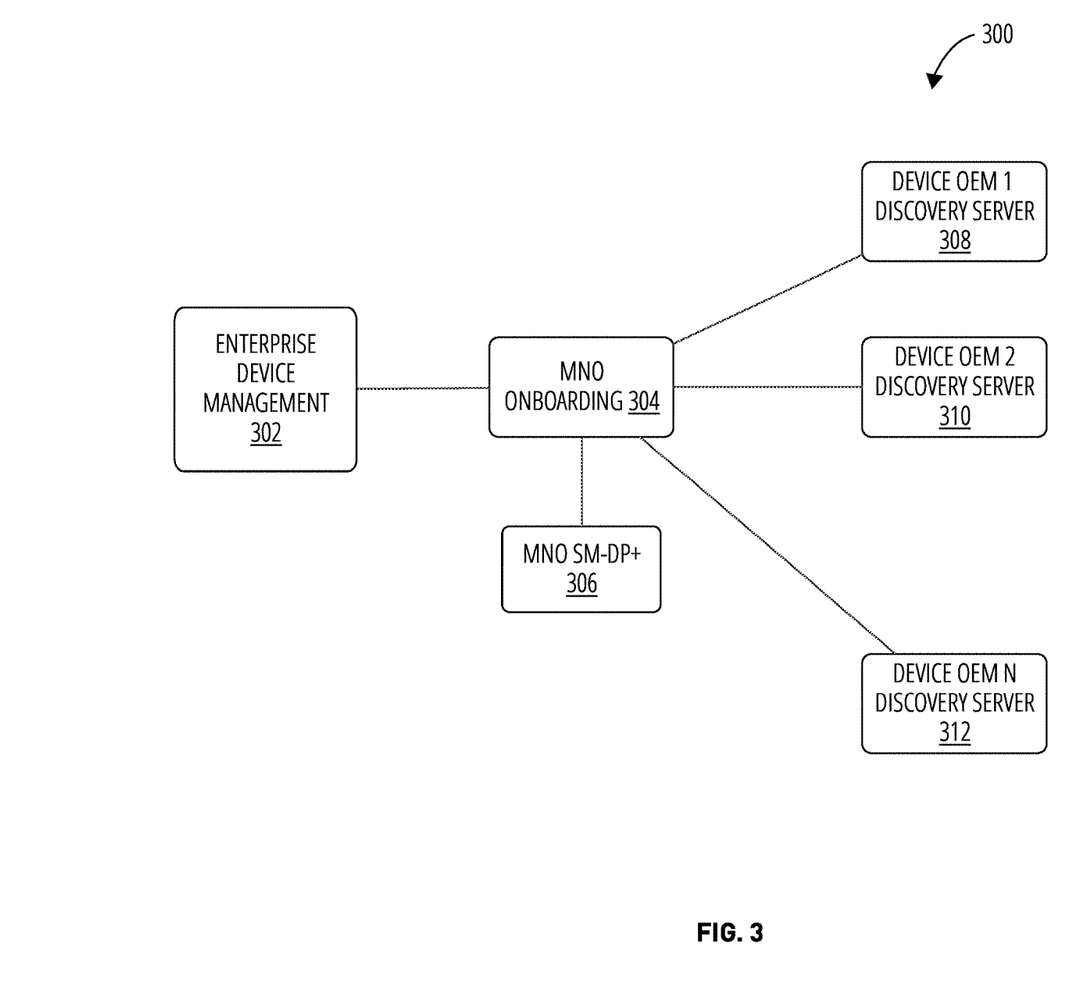
FIG. 3 illustrates an example profile registration process.

In particular, an MNO can provide a separate network entity (also referred to as an onboarding server) to perform discovery registration and/or deregistration. The onboarding server allows the MNO to have full control over integrations and profile management while keeping its SM-DP+ server compliant with the GSMA specifications. As shown in FIG. 3, the MNO maintains both an MNO onboarding server 304 and an SM-DP+ server 306 that is compliant with the GSMA specifications. The enterprise device management system 302 sends a request to the MNO onboarding server 304 requesting a batch of eSIM profiles for different devices. After receiving the request, the MNO onboarding server 304 can notify the MNO SM-DP+ server 306 to prepare the requested profiles. Because the devices can come from different OEMS that are associated with respective discovery servers 308, 310, 312, the enterprise device management system 302 does not always know the linkage between the device EID and the profile to be assigned. To address this issue, the MNO onboarding server 304 can register the EIDs of the devices with the discovery servers 308, 310, 312 while the MNO SM-DP+ server 306 prepares the requested eSIM profiles. The separate onboarding server 304 enables the enterprise device management system 302 to assign the profiles flexibly at a later stage so long as the EIDs are provided prior to any of the eSIM profiles is downloaded. For example, the enterprise device management system 302 can provide the EIDs at the time of sending the profile request. As another example, the enterprise device management system 302 can provide the EIDs after sending the request and while the MNO SM-DP+ server 306 prepares the eSIM profiles.

Figure 4:
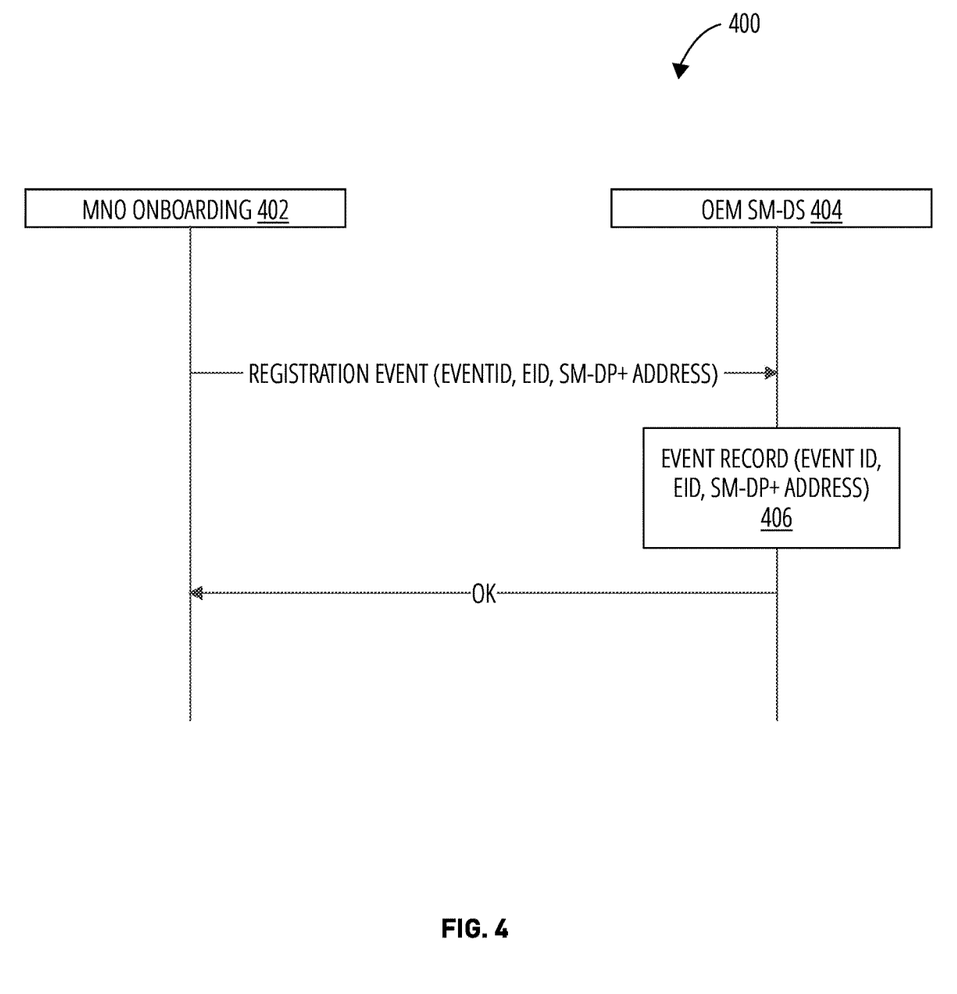
FIG. 4 illustrates an example signaling sequence between a Mobile Network Operation (MNO) onboarding server and an Original Equipment Manufacturer (OEM) Subscription Manager-Discovery Server (SM-DS).

FIG. 4 illustrates an example signaling sequence 400 between an MNO onboarding server and an OEM SM-DS in accordance with one or more embodiments of the present technology. Upon knowing the unique device identifier, such as the EID, the MNO onboarding server 402 transmits a registration event to a corresponding OEM SM-DS 404. The register event can include information such as the event identifier (eventID), the EID, and the MNO SM-DP+ server address. The OEM SM-DS can store an event record 406 with the provided information for subsequent profile acquisition by the user device. The registration event can occur any time before the user device acquires the assigned profile.

Figure 5:
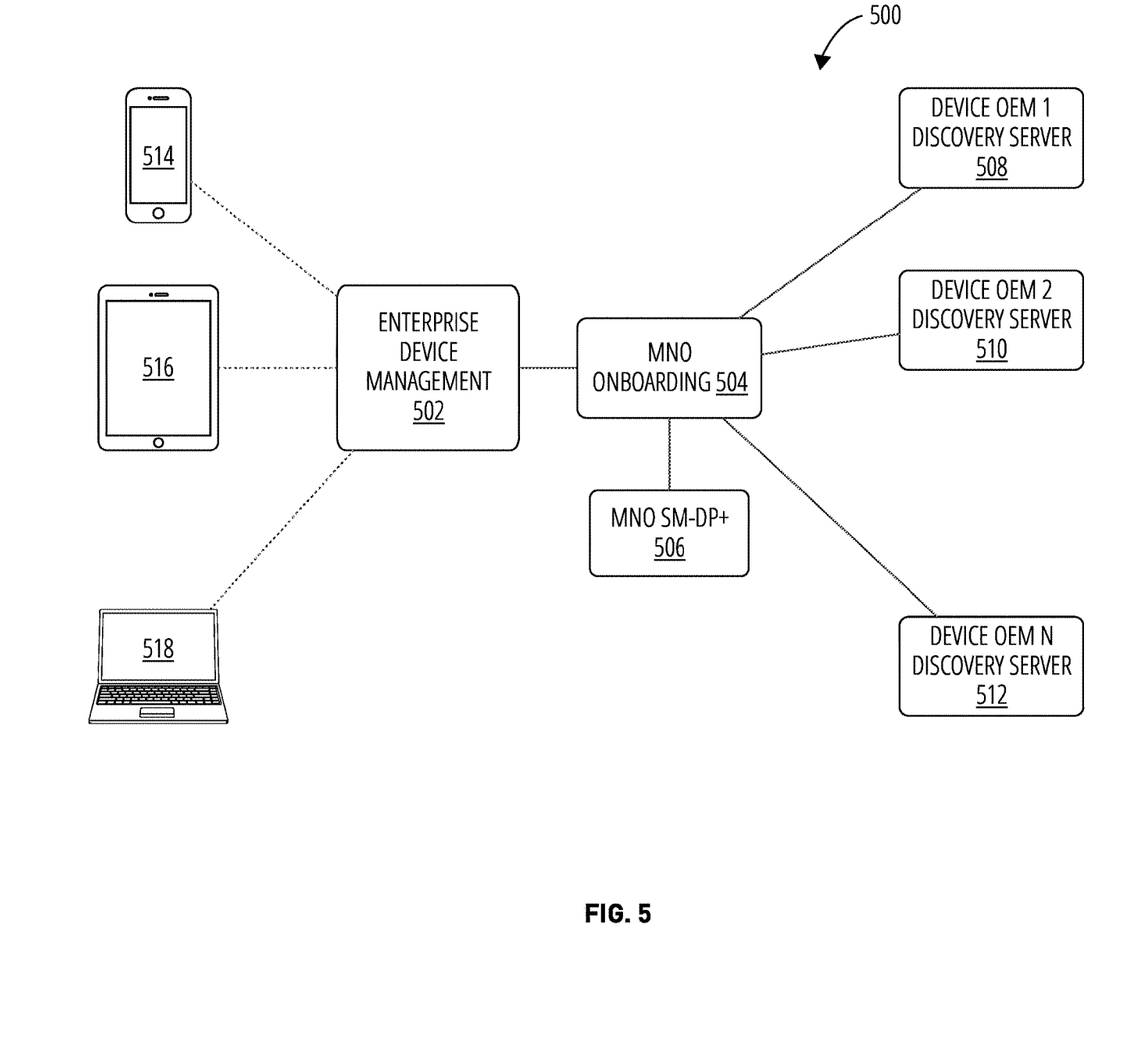
FIG. 5 illustrates an example profile assignment process.

FIG. 5 illustrates an example profile assignment process 500 in accordance with one or more embodiments of the present technology. Once the MNO SM-DP+ server 506 prepares the requested profiles, the enterprise device management system 502 is free to assign the prepared profiles using corresponding profile tokens. For example, the enterprise device management system 502 can assign profile tokens to the devices 514, 516, 518 either arbitrarily or on a first-come-first-served basis. After a profile token is assigned to a device and the device is registered with its OEM SM-DS, the linkage between the device EID and the assigned profile is established and known to the MNO. The linkage also becomes retrievable by various entities (e.g., the user device) to allow subsequent profile acquisition.

Figure 6:
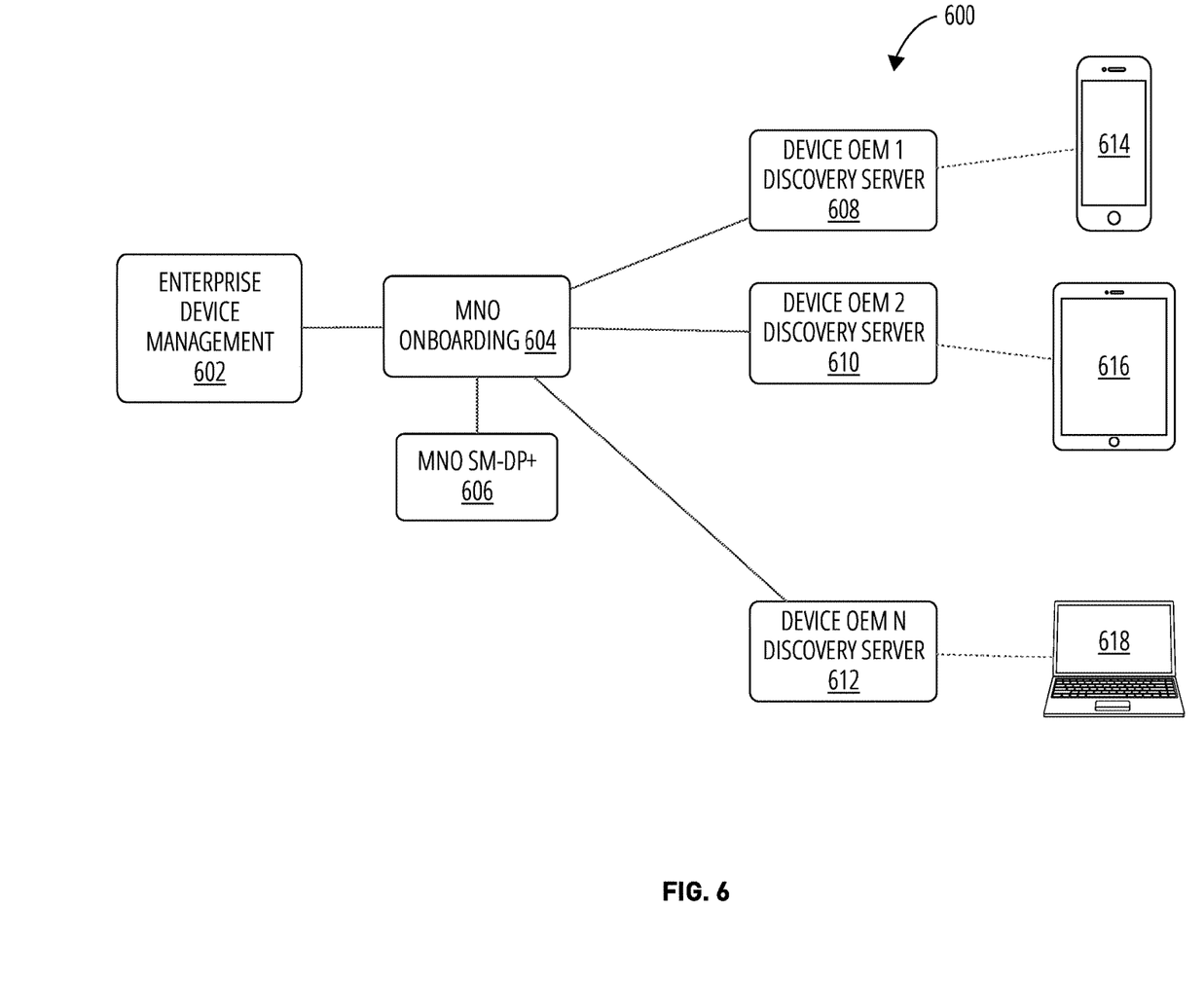
FIG. 6 illustrates a first step of an example profile acquisition process.
Figure 7:
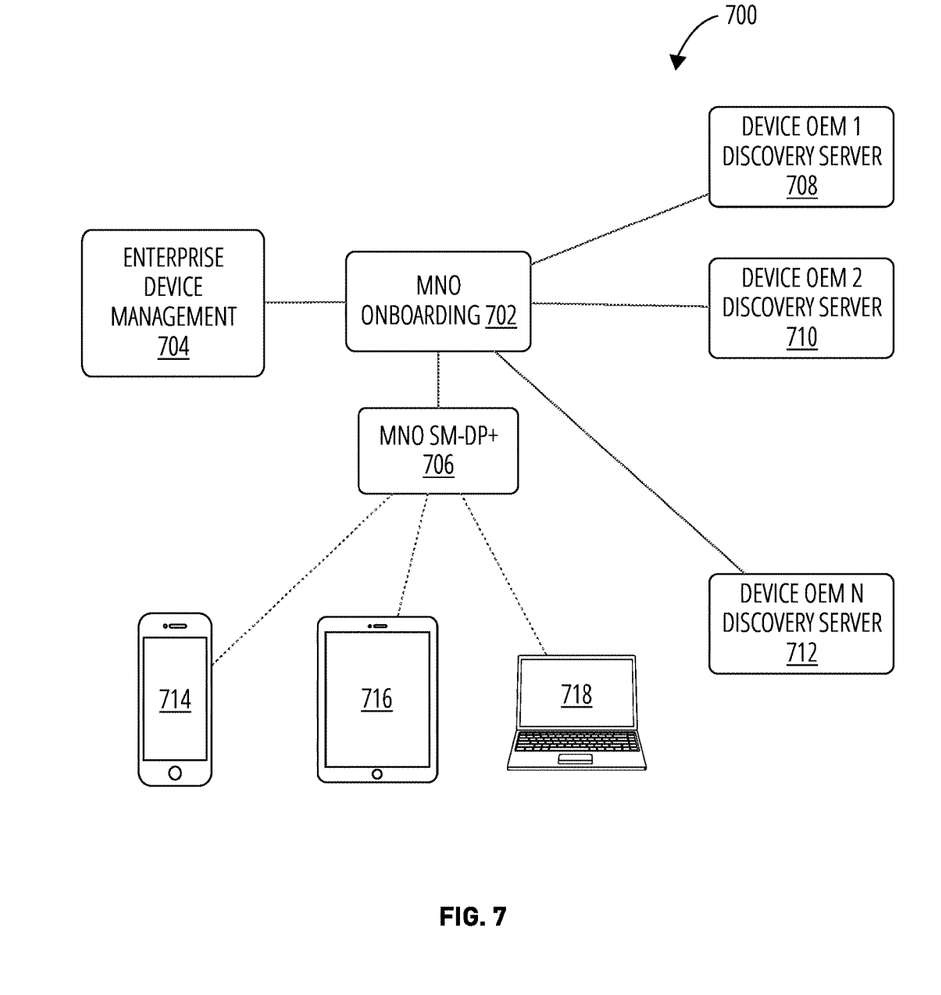
FIG. 7 illustrate a second step of an example profile acquisition process.

FIGS. 6-7 illustrate example profile acquisition processes 600, 700 in accordance with one or more embodiments of the present technology. As shown in FIG. 6, after an eSIM profile is assigned to a device, the device 614, 616, or 618 contacts the respective OEM discovery server 608, 610, or 612 to retrieve the address for the MNO SM-DP+ server 606. The device then contacts the MNO SM-DP+ server to acquire the eSIM profile using the profile token. As shown in FIG. 7, the device 714, 716, or 718 contacts the MNO SM-DP+ server 706, based on the retrieved address, to download the profiles using the profile token.

Figure 8:
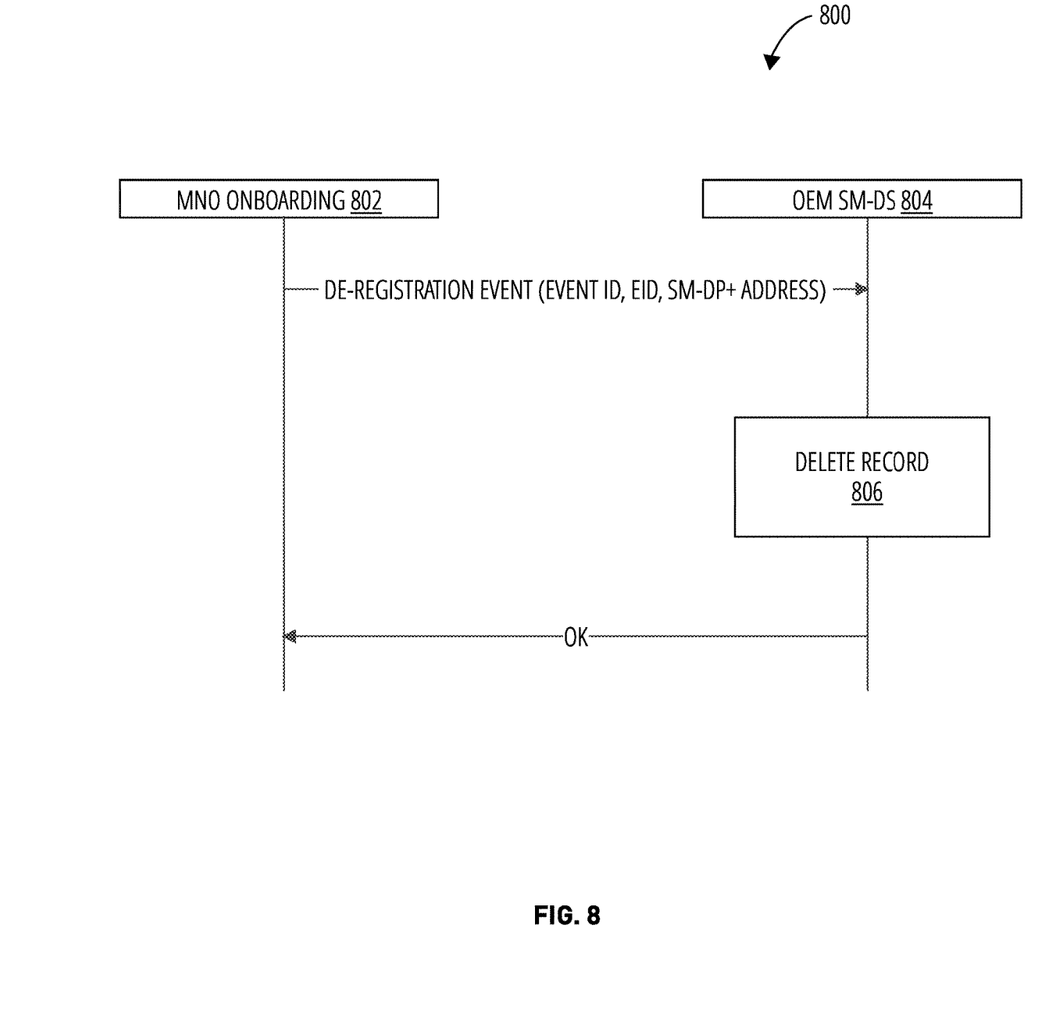
FIG. 8 illustrates an example deregistration process.

Once the profile is successfully downloaded, the corresponding registration record in the OEM SM-DS can be deregistered. FIG. 8 illustrates an example deregistration process 800 in accordance with one or more embodiments of the present technology. After the profile is acquired by the user device, the MNO SM-DP+ server can notify the MNO onboarding server 802 of the completion of the profile acquisition. The MNO onboarding server 802 sends a deregistration event to the corresponding OEM SM-DS 804 with the EID and the MNO SM-DP+ address. Based on the provided EID and the MNO SM-DP+ address, the OEM SM-DS 804 can delete the previously stored event record at operation 806.

Figure 9:
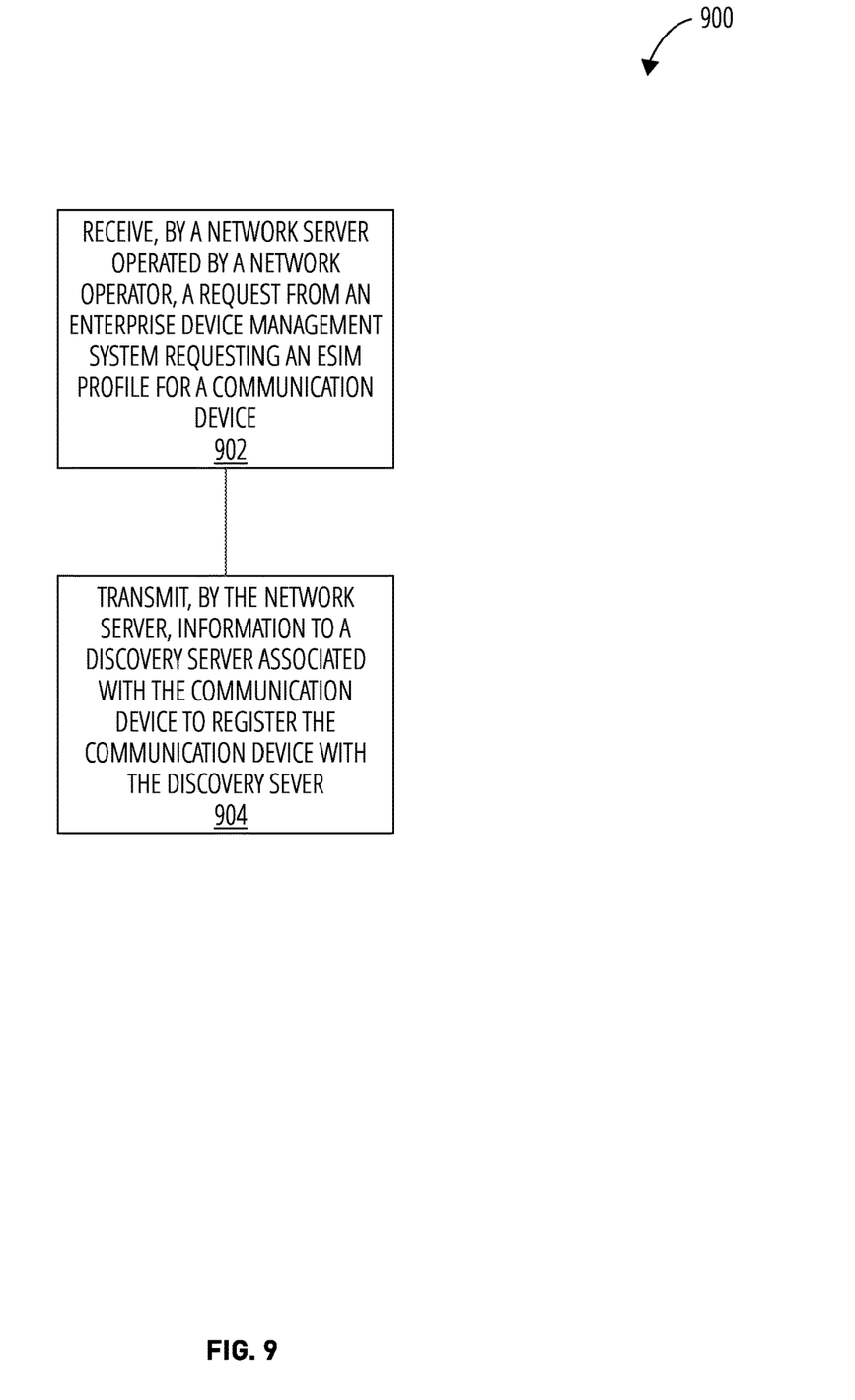
FIG. 9 is a flowchart representation of a method for providing an eSIM solution to enterprises.

FIG. 9 is a flowchart representation of a method 900 for providing an eSIM solution to enterprises in accordance with one or more embodiments of the present technology. The method 900 includes, at operation 902, receiving, by a network server operated by a network operator, a request from an enterprise device management system requesting an eSIM profile for a communication device. The method 900 includes, at operation 904, transmitting, by the network server, information to a discovery server associated with the communication device to register the communication device with the discovery sever. The information comprises a unique identifier of the communication device and an address of a profile preparation server configured to prepare eSIM profiles for communication devices.

CONCLUSION

As noted above, the current solution for managing enterprise eSIM is not clearly defined. The GSMA provides a single global discovery server to manage eSIM profile registration/deregistration. However, a single server fails to scale with the amount of global data. Thus, multiple device OEMs have proposed to develop their own discovery servers.

The present application discloses techniques that can be implemented in various embodiments to establish subscription management servers by the network operators so as to manage eSIM profile registration/deregistration, as well as provide other benefits. The network operator servers can communication with a number of discover servers offered by OEMs, thereby eliminating the need for the enterprises to communicate with different OEM discovery servers and manage registration/deregistration by themselves. Operating a separate network entity (e.g., the onboarding server) by the network operators allows enterprises to flexibility request and assign eSIM profiles. The linkage between a device and its assigned profile, which is sometimes unknown to the enterprise, can be established and managed by the network operators to enable smooth profile acquisition by enterprise devices, thereby allowing the enterprise to seamlessly manage its eSIM capable devices.

Figure 10:
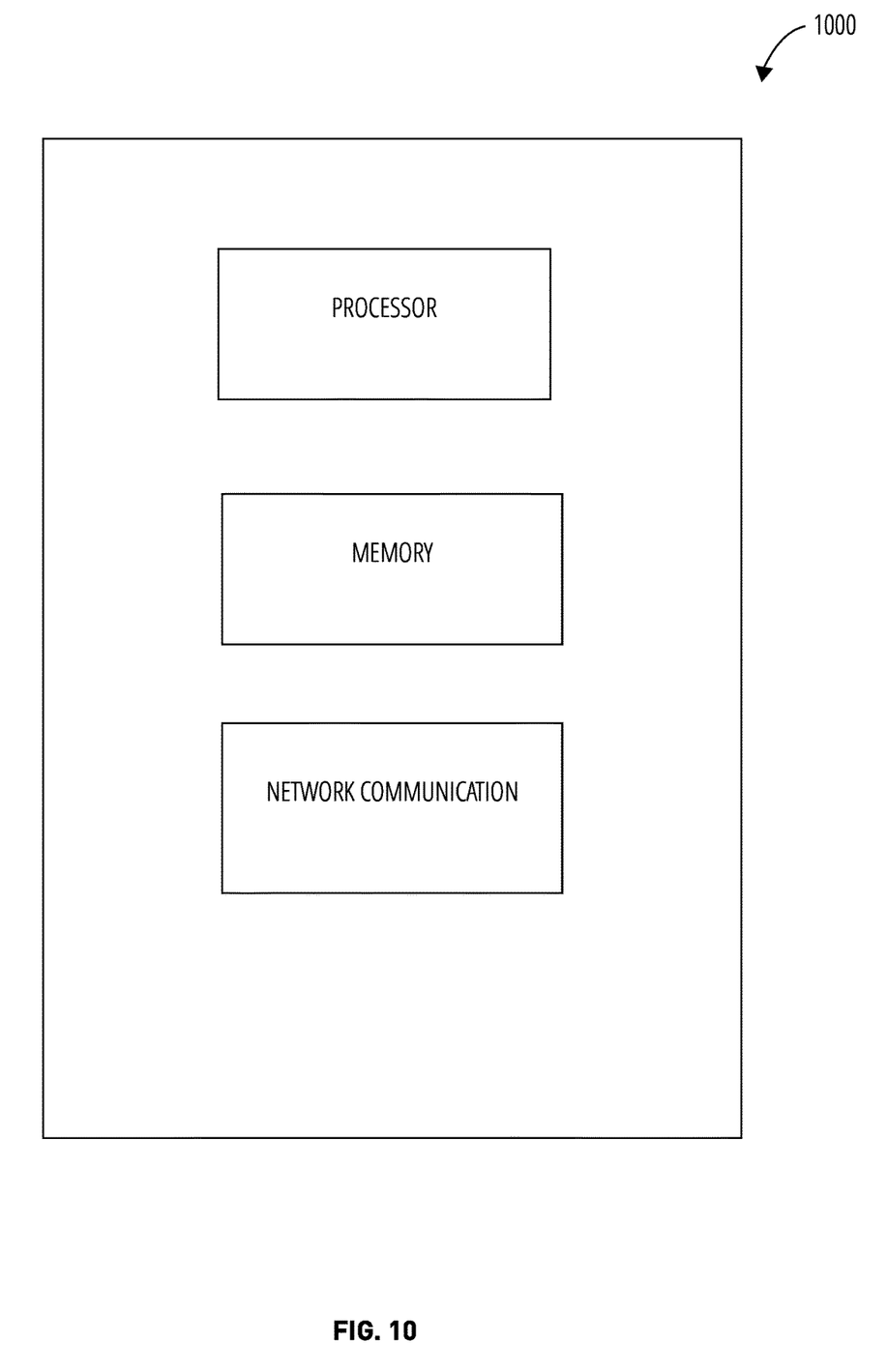
FIG. 10 is a diagrammatic representation of a machine in the example form of a computer system within which a set of instructions, for causing the machine to perform any one or more of the methodologies or modules discussed herein, can be executed.

FIG. 10 is a diagrammatic representation of a machine in the example form of a computer system 1000 within which a set of instructions, for causing the machine to perform any one or more of the methodologies or modules discussed herein, can be executed.

In the example of FIG. 10, the computer system 1000 includes a processor, memory, non-volatile memory, and a network communication interface device. Various common components (e.g., cache memory) are omitted for illustrative simplicity. The computer system 1000 is intended to illustrate a hardware device on which any of the components described in the example of FIGS. 1-8 (and any other components described in this specification) can be implemented. The computer system 1000 can be of any applicable known or convenient type. The components of the computer system 1000 can be coupled together via a bus or through some other known or convenient device.

This disclosure contemplates the computer system 1000 taking any suitable physical form. As example and not by way of limitation, computer system 1000 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1000 can include one or more computer systems 1000; be unitary or distributed; span multiple locations; span multiple machines; or reside in a cloud, which can include one or more cloud components in one or more networks. Where appropriate, one or more computer systems 1000 can perform without substantial spatial or temporal limitation one or more steps of one or more methods described or illustrated herein. As an example and not by way of limitation, one or more computer systems 1000 can perform in real time or in batch mode one or more steps of one or more methods described or illustrated herein. One or more computer systems 1000 can perform at different times or at different locations one or more steps of one or more methods described or illustrated herein, where appropriate.

The processor can be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1000. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory can not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1000. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 5 reside in the interface.

In operation, the computer system 1000 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

A storage medium typically can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, and any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

The invention claimed is:

1. A method for obtaining an embedded subscriber identity module (eSIM) profile in an enterprise environment, comprising:
   receiving, by a communication device associated with an enterprise, a profile token from an enterprise management system,
   wherein the profile token corresponds to an eSIM profile of the communication device, and wherein the eSIM profile is prepared by a profile preparation server operated by a service provider;
   retrieving, by the communication device, an address of the profile preparation server from a discovery server operated by an Original Equipment Manufacturer (OEM) of the communication device,
      wherein the communication device is registered with the discovery server based on a unique identifier of the communication device; and
   acquiring, by the communication device, the eSIM profile from the service provider using the address of the profile preparation server.

2. The method of claim 1, wherein the profile preparation server comprises a Subscription Manager-Data Preparation+ (SM-DP+) server that is compliant with a Global System for Mobile Communications standard.

3. The method of claim 1, wherein the unique identifier of the communication device comprises an Embedded Universal Integrated Circuit Card Identification.

4. The method of claim 1, comprising:
   providing, by the communication device, the unique identifier of the communication device to the enterprise management system.

5. A method for managing communication devices associated with an enterprise, comprising:
   transmitting, by an enterprise device management system to a network server operated by a service provider, one or more requests that request one embedded subscriber identity module (eSIM) profiles for the communication devices associated with the enterprise,
   wherein the one or more requests trigger the network server to:
   request preparation of the eSIM profiles by a profile preparation server and,
   transmit information associated with the communication devices to a discovery server for registrations of the communication devices; and
   assigning, by the enterprise device management system, profile tokens corresponding to the requested eSIM profiles to the communication devices to enable the communication devices to acquire the eSIM profiles.

6. The method of claim 5, wherein transmitting the one or more requests comprises:
   providing unique identifiers of the communication devices to the network server as part of the one or more requests.

7. The method of claim 6, wherein the unique identifiers of the communication devices comprise an Embedded Universal Integrated Circuit Card Identification.

8. The method of claim 5, comprising:
   providing unique identifiers of the communication devices to the network server subsequent to the transmitting of the one or more requests.

9. The method of claim 5, wherein the profile preparation server comprises a Subscription Manager-Data Preparation+ (SM-DP+) server that is compliant with a Global System for Mobile Communications standard.

10. The method of claim 5, wherein the communication devices are associated with different Original Equipment Manufacturers (OEMs).

11. The method of claim 5, wherein the discovery server associated with the communication devices is operated by an Original Equipment Manufacturer (OEM) of the communication devices.

12. A network system operated by a wireless service provider for providing an embedded subscriber identity module (eSIM) solution, the network system comprising:
a profile preparation server configured to:
prepare eSIM profiles for wireless communication devices associated with an enterprise; and
a network server in communication with the profile preparation server, configured to:
notify the profile preparation server to prepare an eSIM profile for a wireless communication device upon receiving a first request requesting the eSIM profile for the wireless communication device; and
transmit information associated with the wireless communication device to a discovery server for a registration of the wireless communication device,
wherein the information comprises a unique identifier of the wireless communication device and an address of the profile preparation server,
wherein the profile preparation server is further configured to transmit the eSIM profiles to the wireless communication devices after the information is provided to the discovery server, wherein each of the eSIM profiles corresponds to a profile token assigned by an enterprise management system.

13. The network system of claim 12, wherein the profile preparation server comprises a Subscription Manager-Data Preparation+ (SM-DP+) server that is compliant with a Global System for Mobile Communications standard.

14. The network system of claim 12, wherein the wireless communication devices associated with the enterprise are managed by an enterprise device management system that is configured to transmit the first request to the profile preparation server.

15. The network system of claim 12, wherein the wireless communication devices are associated with different Original Equipment Manufacturers (OEMs).

16. The network system of claim 12, wherein the discovery server associated with the wireless communication device is operated by an Original Equipment Manufacturer (OEM) of the wireless communication device.

17. The network system of claim 12, wherein the unique identifier of the wireless communication device comprises an Embedded Universal Integrated Circuit Card Identification.

18. The network system of claim 12, wherein the information to the discovery server further comprises an identifier that identifies a registration event of the wireless communication device.

19. The network system of claim 12, wherein the network server is further configured to:
receive a notification from the profile preparation server indicating that the eSIM profile has been acquired by the wireless communication device; and
transmit information to the discovery server associated with the wireless communication device to de-register the wireless communication device from the discovery server.

* * * * *